United States Patent Office 3,410,805
Patented Nov. 12, 1968

3,410,805
PAINT STRIPPER COMPOSITION
Henry A. Goldsmith, Torrance, and Luis Salavarrieta, Reseda, Calif., assignors to Purex Corporation, Ltd., Lakewood, Calif., a corporation of California
No Drawing. Filed Mar. 9, 1964, Ser. No. 350,590
28 Claims. (Cl. 252—158)

ABSTRACT OF THE DISCLOSURE

The use of an N-substituted sulfonamide and a glycol additive improves substantially the paint removing efficiency of alkali metal hydroxide solution.

---

This invention relates to compositions useful in the removal or stripping of paints or coatings, and is more especially directed to a composition particularly effective in the removal of chemically resistant coatings and paints such as those based on epoxy and acrylic resins, from surfaces of alkali resistant metals, e.g., steel.

Very adherent, durable paints and coatings based upon chemically resistant resins have been developed, owing to the superior properties of these paints or coating compositions over the conventional lacquers and paints. Such coatings include those based on polyurethane, vinyl, acrylic, epoxy and epoxy modified acrylic resins. For example, certain widely used types of automative coatings or paints include acrylic or epoxy modified acrylic resins. However, because of the tenacity and durability of coatings based on such resins, and particularly on epoxy and acrylic resins, there has been a problem of developing means for removing or stripping such obdurate coatings and paints rapidly and efficiently from surfaces to which they have been applied, for example, from defectively coated parts, or parts which it is desired to repaint or to inspect for cracks and other flaws.

Although strippers have been developed for this purpose, they have not proven entirely satisfactory from the standpoint of rapid removal of these coatings. Many prior art compositions require prolonged periods of treatment for complete stripping of chemically resistant coatings. Aqueous alkali solutions containing phenolic compounds such as the cresylates have been employed as hot tank strippers for the obdurate types of coatings described above. However, the use of phenolics in strippers presents a serious problem because of restrictions against the disposal of phenolics into sewage systems in many areas.

It is an object of this invention to provide novel coating or paint stripping compositions having superior effectiveness for removing obdurate coating compositions such as those based upon acrylic and epoxy resins.

Another object is the provision of novel alkaline non-phenolic paint and coating strippers effective for rapidly removing obdurate paints or coatings, e.g., those based on epoxy, polyurethane, vinyl, acrylic, epoxy, and epoxy modified acrylic resins.

Still another object is the provision of paint strippers in the form of aqueous alkali solutions containing non-phenolic additives, such solutions being designed to remove tough recalcitrant coatings or paints based on the above-noted resins, and particularly for removal of acrylate and epoxy modified acrylate paints and finishes such as those applied on automotive parts, by hot tank treatment in such solutions for a short period, e.g., of the order of a few minutes.

Yet another object is to afford additive, or combined alkali-additive formulations, in liquid form or in the form of a solid or powder mixture, and designed to be added to aqueous alkali or to water, to produce a working aqueous alkali-additive paint stripper solution capable of removing coatings, particularly of the types noted above.

A still further object is to afford paint strippers of the nature noted above, which have good stability and which can be applied either by immersion of the part in the composition or by spray, brush or similar application to the coated surface of the part.

A further object is the provision of procedure for effective removal of obdurate paints and coatings of the types noted above.

Other objects and advantages will appear hereinafter.

It has been found that tenacious organic coatings and paints, particularly obdurate acrylic and epoxy coatings, as, for example, epoxy modified acrylic coatings such as those applied as a finish over automative parts, can be stripped in a relatively short period by treatment with an alkaline composition comprising alkali and an additive composed of an N-hydrocarbon substituted, preferably an N-alkyl or N-aryl substituted, aryl sulfonamide capable of forming water-soluble alkali metal salts, and a polar solvent in the form of a glycol or glycol derivative of low volatility, preferably a glycol ether, as described in greater detail below. Thus, for example, it has been found that effective stripping action on epoxy-modified acrylic paints can be obtained in as short a period as from about 2 to about 5 minutes by immersion of steel parts containing such coatings in a hot or boiling mixture in water of sodium hydroxide, N-ethyl toluene sulfonamide, and either the monohexyl ether of ethylene glycol or the monobutyl ether of diethylene glycol. Thus, aqueous alkali non-phenolic strippers have been provided which are at least as effective, as strippers of obdurate coatings, e.g., of the epoxy or acrylic type, and even more effective in some instances, as compared to the prior art aqueous alkali phenolic strippers.

The theory of the function of the sulfonamide and glycol components of the novel stripper additive of the invention is not entirely understood. However, without intending to limit the invention thereby, it is known that the N-alkyl or N-aryl substituted aryl sulfonamide forms a salt with the alkali, e.g., sodium hydroxide, in the stripper solution, and it is believed that such sulfonamide salt has hydrotropic or coupling properties and may also function as a wetting agent and solvent soluble in alkali, as in the case of phenols under similar conditions. The polar solvent or the glycol component of the additive is believed to function at least in some measure as a plasticizer with respect to the paints or lacquers to be removed, thus permitting them to go limp and blister in the stripping tank. The sulfonamide and glycol components of the additive mixture are believed to function in a synergistic manner in effecting rapid and complete removal of tough coatings such as polyurethane, vinyl, acrylic and epoxy coatings, and such effective stripping action cannot be obtained in the absence of either the sulfonamide or the glycol solvent.

The alkali component of the stripper composition of the invention can be an alkali metal hydroxide such as sodium hydroxide, potassium hydroxide, and lithium hydroxide. Also, if desired, a minor proportion of such alkali metal hydroxide can be replaced by trisodium phosphate, sodium carbonate, or sodium metasilicate. Hence, the term "alkali" employed in the specification and claims is intended to denote and include the above-noted alkali metal hydroxides and also the above-noted alkali metal salts.

The sulfonamide component of the additive mixture employed in the invention composition is an N-alkyl or N-aryl substituted aryl or alkylaryl sulfonamide, the nitrogen atom of the sulfonamide carrying one free hydrogen atom. The sulfonamide employed in the invention composition can be represented by the formula

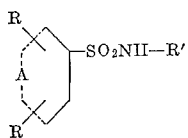

where A represents the atoms necessary to complete an aromatic ring, e.g., a phenyl or naphthyl ring, preferably phenyl; R is $CH_3$, $C_2H_5$ or H, and both R's can be the same or different; and R' can be alkyl, either straight or branched-chain, which includes substituted alkyl such as benzyl; phenyl, which includes substituted phenyl such as tolyl; or alicyclic such as cyclohexyl, R' containing from 1 to 8 carbon atoms. Thus, R' can be methyl, ethyl, propyl, butyl, isopropyl, isobutyl, amyl, hexyl, heptyl, octyl, cyclopentyl, cyclohexyl, and the like.

The preferred toluene sulfonamide compounds of the invention have the general formula

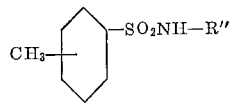

where R" is an alkyl group of from 1 to 4 carbon atoms, or cyclohexyl.

Specific examples of N-alkyl and N-aryl substituted aryl sulfonamides which can be employed in the invention composition include:

N-methyl benzene sulfonamide
N-ethyl benzene sulfonamide
N-propyl benzene sulfonamide
N-propyl benezene sulfonamide
N-isobutyl benzene sulfonamide
N-hexyl benzene sulfonamide
N,N'-propylene bis-(benzene sulfonamide)
N-cyclohexyl benzene sulfonamide
N-phenyl benzene sulfonamide
N-methyl toluene sulfonamide
N-ethyl toluene sulfonamide
N-isopropyl toluene sulfonamide
N-cyclohexyl toluene sulfonamide
N-phenyl toluene sulfonamide
N-methyl xylene sulfonamide
N-ethyl xylene sulfonamide
N-butyl xylene sulfonamide
N-phenyl xylene sulfonamide
N-ethyl naphthalene sulfonamide
N-propyl naphthalene sulfonamide
N-methyl p-ethyl benzene sulfonamide
N-ethyl o-ethyl benzene sulfonamide
N-ethyl o,p-diethyl benzene sulfonamide In the above exemplary toluene sulfonamide compounds, these may be ortho, para or meta toluene sulfonamides, and in the above exemplary xylene sulfonamides the xylenes can be ortho, meta or para xylenes.

Mixtures of the above sulfonamide compounds can also be employed. Thus, for example, commercially available mixtures of the ortho and para N-ethyl toluene sulfonamides, marketed as Santicizer 8, or of the ortho and para N-cyclohexyl toluene sulfonamides, marketed as Santicizer 1H, can be utilized. These are preferred sulfonamides for use in the alkali-additive stripper compositions hereof.

The glycol component employed in the invention stripper composition can be a glycol or a glycol monoether. Thus, for example, the alkyl and phenyl monoethers of glycols or polyglycols can be employed. Suitable glycols for purposes of the invention are represented by the formula $$R_1-O[CHR^2CHR^2(CH_2)_mO]_nH$$

where $R_1$ is hydrogen, or alkyl, which includes substituted alkyl such as benzyl, cycloalkyl, or phenyl, which includes substituted phenyl such as tolyl, said alkyl, cycloalkyl or phenyl group containing from 1 to 8 carbon atoms, preferably 1 to 6 carbon atoms such as methyl, ethyl, butyl, hexyl, cyclopentyl, cyclohexyl, ethylphenyl, and the like; $R^2$ is hydrogen or an alkyl group of from 1 to 4 carbon atoms, $m$ is an integer of from 0 to 4, and $n$ is an integer of from 1 to 3. The glycol or glycol ether should have a minimum of 5 carbon atoms and not more than about 12 carbon atoms in the entire molecule. The maximum number of carbon atoms is limited by the solubility of the material in the alkali solution.

Preferred glycol materials employed in the invention composition are glycol ethers having the formula

where $R^3$ is an alkyl group of from 1 to 6 carbon atoms, $n$ is an integer of 1 to 3, and the total number of carbon atoms in the molecule ranges from 5 to about 12.

Specific illustrative examples of glycols which can be employed in the invention composition with varying degrees of effectiveness include:

hexylene glycol;
octylene glycol (2-ethyl-3-hexanediol)
monophenyl ether of ethylene glycol (phenyl Cellosolve, marketed as Dowanol EP);
monobutyl ether of ethylene glycol (butyl Cellosolve);
n-hexyl ether of ethylene glycol (n-hexyl Cellosolve);
cycopentyl and cyclohexyl ethers of ethylene glycol;
monophenyl ether of diethylene glycol;
monomethyl ether of diethylene glycol (methyl Carbitol);
monobutyl ether of diethylene glycol (butyl Carbitol);
n-hexyl ether of diethylene glycol (n-hexyl Carbitol);
monophenyl ether of propylene glycol;
monoethyl ether of propylene glycol;
and the like.

Alkyl and cycloalkyl glycol ethers are preferred because of their superior stability in hot alkaline baths.

The phenyl glycol ethers are suitable when freshly made for use in the alkali-additive compositions hereof to produce effective strippers, as noted in the working examples hereinafter. However, phenyl glycol ethers tend to hydrolyze after a prolonged period in the presence of alkali, and such phenyl glycol ethers accordingly are not the preferred glycol ethers for purposes of the invention. The preferred glycol components are the glycol ethers, butyl Carbitol, n-hexyl Carbitol and n-hexyl Cellosolve.

The relative proportions of the sulfonamide and glycol solvent components of the additive of the stripper composition of the invention can range from 1 part of the sulfonamide to 5 parts of the glycol component, to 5 parts of the sulfonamide to 1 part of the glycol component, by weight. It is preferred to employ proportions of sulfonamide to glycol component ranging from 1 to 3, to 3 to 1. Particularly satisfactory results are obtained employing a major portion of the glycol, particularly the glycol ethers, and a minor proportion of the sulfonamide. Approximately equal proportions of both these components of the additive have also provided satisfactory results.

Of the total compositon of alkali and additive, about 5% to 35% of such composition can be composed of the additive mixture. In preferred practice, approximately 10% to 25% of the additive mixture of sulfonamide and glycol component is employed, based on the total weight of the alkali-additive mixture. Hence, the alkali content of the alkali-additive composition can range from about 65% to about 95%, preferably from about 75% to about 90% by weight of the total alkali-additive composition.

A preferred composition, for example, is one which contains about 80% alkali, such as sodium hydroxide, about 5% to about 10% of the sulfonamide, such as N-ethyl toluene sulfonamide, and about 15% to about 10% glycol component, such as butyl Carbitol, by weight.

As previously noted, a minor amount of the alkali content of the alkali-additive composition can be in the form of an alkaline salt such as trisodium phosphate, soda ash or sodium metasilicate. When using such low-density, spray-dried alkaline salts, alkali-additive blends or mixtures have been found to yield granular, free-flowing powders by incorporating the above-noted sulfonamide and glycol additives into the spray-dried alkaline salt, e.g., trisodium phosphate, adding the caustic alkali, e.g., caustic soda, and then mixing until homogeneous. It has been found that the spray-dried alkaline salt functions essentially to absorb the generally liquid additive mixture. The trisodium phosphate or other alkaline salt employed generally replaces an equivalent amount of the caustic alkali in the alkali-additive composition. Such alkaline salts can be employed in amounts ranging from about 5% to about 20%, preferably about 10% to about 15%, by weight of the total alkali-additive composition. Thus, for example, an alkali-additive composition which can contain 80% sodium hydroxide in the absence of any trisodium phosphate, can be replaced by an alkali-additive composition containing 65% of sodium hydroxide and 15% of trisodium phosphate to form the above-noted granular free-flowing alkali-additive mixtures, by mixing rapidly and dissipating the mixing heat.

The alkali-additive mixtures or blends, including the sulfonamide and glycol components described above, such mixtures being in liquid or in powder form, can be added to water to form the aqueous alkali non-phenolic working stripping solutions of the invention. Thus, for example, working solutions of this type can be provided by adding the alkali-additive mixtures to water in an amount such as to give about a 5% to about a 25% concentration of the blend, preferably about a 10% to about a 20% concentration. For this purpose, the blend or mixture of alkali-additives is added to water in amounts of about one-half to about three pounds, preferably about 1 to about 2 pounds, per gallon of solution. The following are examples of practice of the invention.

EXAMPLE 1

Standard panels of automotive red acrylic paint were each immersed or treated at the boiling temperature of the composition with each of Compositions A to F noted in Table I below for a period of from three to five minutes. In each of Compositions A to F, the sulfonamide employed was the N-ethyl toluene sulfonamide mixture (Santicizer 8). In each case, each of the alkali-additive Compositions A to F was employed in a concentration of 1.5 pounds per gallon of solution, corresponding to a concentration of 15% by weight. In the case of Compositions A, C, D and E, the liquid additive in the form of a mixture of the sulfonamide and the particular glycol ether set forth in Table I below was added to an aqueous solution containing caustic alkali in the proportions indicated in Table I. In the case of Compositions B and F containing trisodium phosphate, the liquid additive in the form of a mixture of the sulfonamide and the glycol ether was mixed with the spray-dried trisodium phosphate, the caustic soda was then added, and the entire mixture was mixed rapidly and with good heat dissipation until homogeneous. The resulting mixture, in the form of a granular powder, was then added to water in amount of 1.5 pounds of the alkali-additive per gallon of solution. The results of these stripping tests are set forth in Table I below.

TABLE I

| Components | alkali-Additive Composition—Percent by Weight | | | | | |
| --- | --- | --- | --- | --- | --- | --- |
|  | A | B | C | D | E | F |
| NaOH | 26.5 | 65 | 80 | 80 | 80 | 65 |
| KOH | 53.5 | | | | | |
| N-ethyl toluene sulfonamide | 5 | 5 | 5 | 5 | 10 | 10 |
| Monophenyl ether of ethylene glycol | 15 | 15 | | | | |
| Hexyl Carbitol | | | 15 | | | |
| Butyl Carbitol | | | | 15 | 10 | 10 |
| Trisodium phosphate | | 15 | | | | 15 |
| Stripping Time, minutes | 3(90%) | 5 | >5 | 3 | 3 | 3-4 |
| Amount of Stripping | 5(100%) | 100% | 75% | 100% | 100% | 95-100% |

From Table I above, it is seen that substantially complete stripping of the recalcitrant red acrylate paint of the panels treated was obtained in a period of from 3 to 5 minutes, employing all of Compositions A to F, except in the case of Composition C. Compositions D, E and F, containing butyl Carbitol, were particularly effective. Composition C, containing hexyl Carbitol as the glycol ether, although effective to a major degree in removing the red paint in a period of the order of about five minutes, was not as effective as the other compositions tested.

Example 2

The same testing procedure as in Example 1 was carried out for the stripping of red acrylate automotive paint from standard panels, as in Example 1, using stripping compositions G, H, J, K, L and M, set forth in Table II below. The sulfonamide component employed in each of Compositions G to M of Table II was N-cyclohexyl toluene sulfonamide, and employing 1.5 pounds of alkali-additive composition per gallon of solution, testing being carried out at boil for a period of three to five minutes. The data and results are set forth in Table II below.

TABLE II

| Components | Alkali-Additive Composition Percent By Weight | | | | | |
| --- | --- | --- | --- | --- | --- | --- |
|  | G | H | J | K | L | M |
| NaOH | 80 | 40 | 80 | | 80 | 80 |
| KOH | | 40 | | 80 | | |
| Butyl Carbitol | 15 | 15 | | | | |
| Hexyl Cellosolve | | | 15 | 15 | | |
| Hexyl Carbitol | | | | | 15 | |
| Hexanetriol | | | | | | 15 |
| N-cyclohexyl toluene sulfonamide | 5 | 5 | 5 | 5 | 5 | 5 |
| Stripping Time (minutes) | 3 | 5 | 5 | 5 | 5 | >5 |
| Amount of Stripping | 100% | 100% | 100% | 75% | 100% | 0% |

It will be noted from Table II above that the invention Compositions G, H, J and L resulted in substantially complete stripping of the paint in a period of from 3 to 5 minutes. Composition K, containing KOH and hexyl Cellosolve, however, was not quite as effective as the other compositions G, H, J and L. On the other hand, Composition M, employing hexanetriol in place of a glycol compound, according to the invention, produced no stripping at the end of a five-minute period.

Example 3

Standard automotive panels having a red acrylate paint were tested for stripping effectiveness, employing Compositions, N, O, P, Q and R, of Table III below, employing a combination of sulfonamides comprising a mixture of the N-ethyl toluene sulfonamide and N-cyclohexyl toluene sulfonamide. The alkali-additive concentration in the solutions was 1.5 pounds per gallon, and the panels were treated at boiling for approximately five minutes. The results are set forth in Table III below.

TABLE III

| Components | Alkali-Additive Composition Percent By Weight | | | | |
|---|---|---|---|---|---|
| | N | O | P | Q | R |
| NaOH | 80.5 | 80.5 | 80 | 80 | |
| KOH | | | | | 80 |
| N-ethyl toluene sulfonamide | 3.35 | 3.35 | 5 | 2.7 | |
| N-cyclohexyl toluene sulfonamide | 3.35 | 3.35 | 2.5 | 2.7 | 5 |
| Hexyl Cellosolve | 12.8 | | | | |
| Hexyl Carbitol | | 12.8 | 12.5 | | |
| Butyl Carbitol | | | | 14.6 | |
| Iso-octyl phenol-9 to 10 ethylene oxide condensate (Triton X-100) | | | | | 15 |
| Stripping Time, Minutes | 5 | 5 | 5 | <5 | >5 |
| Amount of Stripping | 100% | 100% | 100% | 100% | 0% |

From Table III above, it is seen that complete stripping of the obdurate acrylate red paint was obtained in the 5-minute period employing Compositions N, O, P and Q. On the other hand, Composition R, employing Triton X-100, a long chain substituted phenolic glycol ether, outside the scope of suitable glycol ethers according to the invention, as described above, effected no stripping of the panels immersed in such composition after a 5-minute boil.

From Examples 1 to 3 above, it is seen that the invention compositions containing as additive a glycol ether such as butyl Carbitol or hexyl Carbitol, and a sulfonamide such as N-ethyl toluene sulfonamide or N-cyclohexyl toluene sulfonamide, are particularly effective as organic additives in aqueous alkali strippers for removal of acrylatecoatings. Hexyl Carbitol and the ethylene glycol ether of phenol are satisfactory glycol components.

Example 4

The procedure of Example 3 is carried out, except that the concentration of alkali-additive is 1 pound per gallon and 2 pounds per gallon, respectively, for each of the compositions.

A longer period of the order of about 7 to 10 minutes is required for stripping in the case of those compositions having a one-pound-per-gallon concentration of alkali-additive, whereas, with a higher concentration of 2 pounds per gallon, complete stripping is obtainable in a period of from about three to about five minutes.

Example 5

Two aqueous alkali solutions were prepared. Solution S contained 1.5 pounds per gallon of an alkali-additive mixture consisting of 62.5% NaOH, 12.5% spray-dried trisodium phosphate, 5% of a lignosulfonate dispersant marked as "Maraperse N," 10% N-ethyl toluene sulfonamide (ortho, para mixture), and 10% butyl Carbitol. Solution T contained two pounds per gallon of the above alkali-additive mixture.

Standard panels painted with a red acrylic automotive paint were immersed respectively in each of solutions S and T at boiling. Solution S stripped the paint from the test panels in 3 to 4 minutes, and Solution T stripped the paint from the similar test panels in 3 minutes.

Example 6

For purposes of comparison, stripping tests were carried out using Compositions U to Y in Table IV below on a blue acrylic automotive paint on standard panels. The compositions were each prepared by adding the monophenyl ether of ethylene glycol, marketed as Dowanol EP, and either the indicated sulfonamide or the indicated phenol compound, to an aqueous solution of sodium hydroxide, employing a total concentration of 1.5 pounds of the total alkali-additive mixture per gallon of solution. In Composition U, the sulfonamide employed was the above-noted N-cyclohexyl mixed o,p-toluene sulfonamide marketed as Santicizer 1H; and in Composition V the sulfonamide employed was the N-ethyl toluene sulfonamide (ortho-para mixture) marketed as Santicizer 8.

The panels to be stripped were immersed in each of Compositions U to Y at boiling for a period of three minutes. The components of Compositions U to Y, and the results, are noted in Table IV below, the percentages of the components given being based on the weight of the aqueous solutions.

TABLE IV

| | Alkali-Additive Composition | | | |
|---|---|---|---|---|
| | Percent NaOH | Percent Monophenyl ether of Ethylene Glycol | Percent Sulfonamide or Phenol | Percent Stripped |
| Composition: | | | | |
| U | 12 | 1.5 | 1.5% N-cyclohexyl toluene sulfonamide | 100 |
| V | 12 | 1.5 | 1.5% N-ethyl toluene sulfonamide | 100 |
| W | 12 | 1.5 | 1.5% sodium salt of pentachloro phenols mixture | 50 |
| X | 12 | 1.5 | 1.5% sodium salt of o-phenyl phenol | 100 |
| Y | 12 | 1.5 | 1.5% o-sec. amyl phenol | 100 |

The results in Table IV above show that the non-phenolic invention Compositions U and V, employing an aryl sulfonamide, produce results at least comparable to, and in some cases superior to, results obtained employing in place of the sulfonamide of the invention composition the phenol compounds in Compositions W, X and Y of Table IV.

Example 7

Results similar to those for Composition V of Example 6 are obtainable employing as the sulfonamide component of Composition V the following alternative compounds:

N-phenyl benzene sulfonamide;
N-hexyl benzene sulfonamide;
N,N'-propylene bis-(benzene sulfonamide);
N-ethyl benzene sulfonamide;
N-ethyl xylene sulfonamide;
N-phenyl xylene sulfonamide.

Example 8

Results similar to those for Composition V of Example 6 are obtainable employing as the glycol solvent in Composition V the following alternative compounds:

Hexylene glycol;
Octylene glycol;
Monophenyl ether of diethylene glycol;
Monomethyl ether of diethylene glycol;
Cyclohexyl ether of ethylene glycol;
Monophenyl ether of propylene glycol.

Example 9

Results similar to those for Composition V of Example 6 are obtainable by employing 2.0% by weight of each of the monophenyl ether of ethylene glycol and N-ethyl toluene sulfonamide.

From the foregoing, it is seen that the invention provides a novel combination of organic additives, and a novel alkali-additive composition which, on addition to aqueous alkali or to water, forms a novel effective aqueous alkali non-phenolic stripper for removal of organic coatings, particularly acrylic and epoxy-modified acrylic paints and coatings, in a short period of time, and which are as effective as, or even more effective than, aqueous alkali strippers containing phenols.

While particular embodiments of the invention have been described for the purpose of illustration, it should be understood that various modifications and adaptations thereof may be made within the spirit of the invention, as set forth in the appended claims.

We claim:

1. A coating remover composition which comprises a substantial proportion of an alkali, a minor proportion of an N-hydrocarbon substituted aryl sulfonamide, and a minor proportion of a glycol component selected from the class consisting of the glycols and the glycol monoethers.

2. A coating remover composition which comprises a substantial proportion of an alkali; a minor proportion of a sulfonamide having the formula

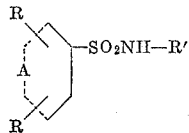

where A represents the atoms necessary to complete an aromatic ring selected from the group consisting of phenyl and naphthyl, R is a member selected from the group consisting of $CH_3$, $C_2H_5$ and H, and R' is a member selected from the group consisting of alkyl, alicyclic and phenyl, R' containing from 1 to 8 carbon atoms; and a minor proportion of a glycol component having the formula

where $R_1$ is a member selected from the class consisting of hydrogen, alkyl, cycloalkyl and phenyl, said alkyl, cycloalkyl and phenyl groups each containing from 1 to 8 carbon atoms; $R^2$ is a member selected from the class consisting of hydrogen and an alkyl group containing from 1 to 4 carbon atoms; $m$ is an integer of from 0 to 4; and $n$ is an integer of from 1 to 3; and wherein the total number of carbon atoms in said glycol component is at least 5 and not more than about 12.

3. A coating remover composition as defined in claim 1, containing about 65% to about 95% by weight of alkali and about 5% to about 35% by weight of an additive mixture composed of said sulfonamide and said glycol component in a weight ratio of from about 1:5 to about 5:1 sulfonamide to glycol component.

4. A coating remover composition as defined in claim 2, containing about 65% to about 95% by weight of alkali, including at least a major portion of an alkali metal hydroxide, and about 5% to about 35% by weight of an additive mixture composed of said sulfonamide and said glycol component in a weight ratio of from about 1:5 to about 5:1 sulfonamide to glycol component.

5. A coating remover composition as defined in claim 4, said alkali consisting essentially of a major portion of alkali metal hydroxide and about 5% to about 20% of an alkaline salt selected from the group consisting of trisodium phosphate, soda ash, and sodium metasilicate, by weight of said composition.

6. A coating remover composition, which comprises about 65% to about 95% by weight of alkali and about 5% to about 35% by weight of an additive mixture composed of a sulfonamide having the formula

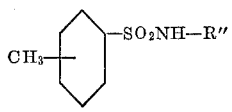

where R″ is an alkyl group of from 1 to about 4 carbon atoms, and a glycol ether having the formula

where $R^3$ is an alkyl group of from 1 to 6 carbon atoms, $n$ is an integer of from 1 to 3, and wherein the total number of carbon atoms in said glycol ether ranges from 5 to about 12 carbon atoms, said sulfonamide and said glycol ether being present in said mixture in a weight ratio of from about 1:5 to about 5:1 sulfonamide to glycol ether.

7. A coating remover composition which comprises about 65% to about 95% by weight of alkali and about 5% to about 35% by weight of an additive mixture composed of a sulfonamide having the formula

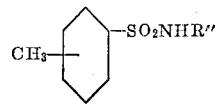

where R″ is a cyclohexyl group, and a glycol ether having the formula

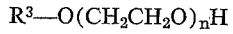

where $R^3$ is an alkyl group of from 1 to 6 carbon atoms, $n$ is an integer of from 1 to 3, and wherein the total number of carbon atoms in said glycol ether ranges from 5 to about 12 carbon atoms, said sulfonamide and said glycol ether being present in said mixture in a weight ratio of from about 1:5 to about 5:1 sulfonamide to glycol ether.

8. A coating remover composition as defined in claim 6, which comprises about 75% to about 90% by weight of alkali, including at least a major portion of an alkali metal hydroxide, and about 10% to about 25% by weight of said additive mixture, said sulfonamide and said glycol ether being present in said mixture in a weight ratio of from about 1:3 to about 3:1 sulfonamide to glycol ether.

9. A coating remover composition as defined in claim 7, which comprises about 75% to about 90% by weight of alkali, including at least a major portion of an alkali metal hydroxide, and about 10% to about 25% by weight of said additive mixture, said sulfonamide and said glycol ether being present in said mixture in a weight ratio of from about 1:3 to about 3:1 sulfonamide to glycol ether.

10. A coating remover composition particularly adapted for removal of coatings based on acrylic and epoxy resins, comprising from about 75% to about 90% by weight of alkali including at least a major portion of an alkali metal hydroxide, and about 10% to about 25% by weight of an additive mixture composed of N-ethyl toluene sulfonamide and a glycol ether of the formula

where $R^3$ is an alkyl group of from 1 to 6 carbon atoms, and $n$ is an integer of from 1 to 3, and wherein the total number of carbon atoms in said glycol ether ranges from 5 to about 12 carbon atoms.

11. A coating remover composition particularly adapted for removal of coatings based on acrylic and epoxy resins, comprising from about 75% to about 90% by weight of alkali including at least a major portion of an alkali metal hydroxide, and about 10% to about 25% by weight of an additive mixture composed of N-ethyl toluene sulfonamide and the monobutyl ether of diethylene glycol, the weight ratio of said sulfonamide to said glycol ether being from about 1:3 to about 3:1.

12. A coating remover composition as defined in claim 11, said alkali consisting essentially of a major portion of alkali metal hydroxide and about 10% to about 15% of trisodium phosphate by weight of said composition.

13. A coating remover composition particularly adapted for removal of coatings based on acrylic and epoxy resins, comprising about 80% by weight of alkali metal hydroxide, about 5% to about 10% by weight of N-ethyl toluene sulfonamide and about 15% to about 10% by weight of the monobutyl ether of diethylene glycol.

14. A coating remover composition particularly adapted for removal of coatings based on acrylic and epoxy resins, comprising about 80% by weight of alkali metal hydroxide, about 5% to about 10% by weight of N-ethyl toluene sulfonamide and about 15% to about 10% by weight of the monohexyl ether of diethylene glycol.

15. A coating remover composition particularly adapted for removal of coatings based on acrylic and epoxy resins, comprising about 80% by weight of alkali metal hydroxide, about 5% to about 10% by weight of N-ethyl toluene sulfonamide, and about 15% to about 10% by weight of the monohexyl ether of ethylene glycol.

16. An additive composition which on addition to aqueous alkali forms a coating remover solution, which comprises an N-hydrocarbon substituted aryl sulfonamide and a glycol component selected from the class consisting of the gylcols and the glycol monoethers.

17. An additive composition which comprises a sulfonamide having the formula

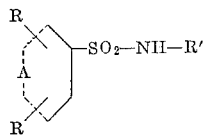

where A represents the atoms necessary to complete an aromatic ring selected from the group consisting of phenyl and naphthyl; R is a member selected from the group consisting of $CH_3$, $C_2H_5$ and H; and R' is a member selected from the group consisting of alkyl, alicyclic and phenyl, R' containing from 1 to 8 carbon atoms; and a glycol component having the formula

where $R_1$ is a member selected from the class consisting of hydrogen, alkyl, cycloalkyl and phenyl, said alkyl, cycloalkyl and phenyl groups each containing from 1 to 8 carbon atoms; $R^2$ is a member selected from the class consisting of hydrogen and an alkyl group containing from 1 to 4 carbon atoms; $m$ is an integer of from 0 to 4; and $n$ is an integer of from 1 to 3, and wherein the total number of carbon atoms in said glycol component is at least 5 and not more than about 12, said sulfonamide and said glycol component being present in a weight ratio of from about 1:5 to about 5:1 sulfonamide to glycol component.

18. An additive composition which consists essentially of N-ethyl toluene sulfonamide and the monobutyl ether of diethylene glycol, in a weight proportion of about 1 to about 3, to about 3 to about 1, sulfonamide to glycol ether.

19. An additive composition which consists essentially of N-ethyl toluene sulfonamide and the monohexyl ether of diethylene glycol, in a weight proportion of about 1 to about 3, to about 3 to 1, sulfonamide to glycol ether.

20. An additive composition which consists essentially of N-ethyl toluene sulfonamide and the monohexyl ether of ethylene glycol, in a weight proportion of about 1 to about 3, to about 3 to 1, sulfonamide to glycol ether.

21. An aqueous alkali coating remover solution, which comprises a substantial proportion of an alkali, a minor proportion of an N-hydrocarbon substituted aryl sulfonamide, and a minor proportion of a glycol component selected from the class consisting of the glycols and the glycol monoethers, the balance being substantially water.

22. An aqueous alkali coating remover solution, comprising about ½ pound to about 3 pounds per gallon of solution of a material containing about 65% to about 95% by weight of alkali including at least a major portion of an alkali metal hydroxide, and a mixture of about 5% to about 35% by weight of said material of an additive composition as defined in claim 17, the balance being substantially water.

23. An aqueous alkali coating remover solution, which comprises about 1 to about 2 pounds per gallon of solution of a material containing about 65% to about 95% by weight of alkali including at least a major portion of an alkali metal hydroxide, and about 5% to about 35% by weight of said material of a mixture of N-ethyl toluene sulfonamide and the monobutyl ether of diethylene glycol, in a weight proportion of about 1 to about 3, to about 3 to about 1, sulfonamide to ether, the balance being water.

24. An aqueous alkali coating remover solution, which comprises about 1 to about 2 pounds per gallon of solution of a material containing about 65% to about 95% by weight of alkali including at least a major portion of an alkali metal hydroxide, and about 5% to about 35% by weight of said material of a mixture of N-ethyl toluene sulfonamide and the monohexyl ether of diethylene glycol, in a weight proportion of about 1 to about 3, to about 3 to about 1, sulfonamide to ether, the balance being water.

25. An aqueous alkali coating remover solution, which comprises about 1 pound to about 2 pounds per gallon of solution of a material containing about 65% to about 95% by weight of alkali including at least a major portion of an alkali metal hydroxide, and about 5% to about 35% by weight of said material of a mixture of N-ethyl toluene sulfonamide and the monohexyl ether of ethylene glycol, in a weight proportion of about 1 to about 3, to about 3 to about 1, sulfonamide to ether, the balance being water.

26. A process for removing a coating based on a resin selected from the group consisting of polyurethane, vinyl, acrylic, epoxy and epoxy-modified acrylic resins, which comprises contacting said coating with an aqueous alkali solution as defined in claim 21, at elevated temperature.

27. A process for removing a coating based on a resin selected from the group consisting of polyurethane, vinyl, acrylic, epoxy and epoxy-modified acrylic resins, which comprises contacting said coating with an aqueous alkali solution as defined in claim 22, at elevated temperature.

28. A process for removing a coating based on a resin selected from the group consisting of polyurethane, vinyl, acrylic, epoxy and epoxy-modified acrylic resins, which comprises contacting said coating with a hot aqueous alkali solution as defined in claim 23.

References Cited

UNITED STATES PATENTS 2,721,847  10/1955  Gebhart et al. _____ 252—152
2,962,395  11/1960  Brown _____ 134—38

FOREIGN PATENTS 783,666  9/1957  Great Britain.
962,234  7/1964  Great Britain.

MORRIS O. WOLK, *Primary Examiner.*

D. CONLIN, *Assistant Examiner.*